United States Patent [19]

Day et al.

[11] 4,356,011
[45] Oct. 26, 1982

[54] POCKET FILTER ASSEMBLY

[75] Inventors: Charles E. Day, Jeffersonville, Ind.; William A. Putman, Louisville, Ky.

[73] Assignee: Allis-Chalmers Corporation, Milwaukee, Wis.

[21] Appl. No.: 267,024

[22] Filed: May 26, 1981

[51] Int. Cl.³ .............................................. B01D 46/02
[52] U.S. Cl. ........................................ 55/368; 55/380; 55/382; 55/483; 55/484; 55/DIG. 12
[58] Field of Search ................. 55/368, 380, 381, 382, 55/483, 484, 500, 511, DIG. 12; 210/323.2

[56] References Cited

U.S. PATENT DOCUMENTS

| | | | |
|---|---|---|---|
| 1,743,934 | 1/1930 | Ruemelin | 55/381 |
| 3,190,059 | 6/1965 | Bauder et al. | 55/382 |
| 3,217,472 | 11/1965 | Babbitt et al. | 55/368 |
| 3,400,519 | 9/1968 | Korn et al. | 55/368 |
| 3,807,147 | 4/1974 | Schoonen et al. | 55/381 |
| 3,873,286 | 3/1975 | Wurtenberg | 55/DIG. 12 |

FOREIGN PATENT DOCUMENTS

| | | | |
|---|---|---|---|
| 136461 | 7/1952 | Sweden | 55/381 |
| 1000457 | 8/1965 | United Kingdom | 55/381 |

Primary Examiner—David L. Lacey
Attorney, Agent, or Firm—Thomas G. Anderson

[57] ABSTRACT

A pocket filter cartridge for removing solid particulates from a dirty gas stream including a plurality of sheath-like filter bags suspended from a common header assembly in side-by-side relation. Each of the filter bags includes a plurality of alternating rows of filamentary stays or span stitching spaced across the width of the bag and extending generally parallel to one another along its length so that upon inflation of the bag by the dirty gas stream during use, the stays shape the bag into a plurality of adjacent tube-like sections opening into one another within the bag. The stays in each row are sized to be of a different length than the stays in the rows adjacent to it to alternately vary the thickness of the bag at the juncture of the tube-like sections formed in the bag.

8 Claims, 10 Drawing Figures

POCKET FILTER ASSEMBLY

BACKGROUND OF THE INVENTION

1. Field of the Invention

The present invention relates to gas separation devices and in particular to a pocket filter cartridge for removing particulate solids from a dirty gas stream.

2. Description of the Prior Art

A pocket filter cartridge generally includes a plurality of relatively flat, sheath-like filter bags secured to a common mounting frame so that the cartridge includes a series of filter pockets suspended from the frame in adjacent side-by-side relation.

Typically, one or more of the filter cartridges are secured across the interior of a gas duct so that particulate materials are separated from the gas stream as it flows through the filter media from the interior of each of the filter pockets. When it becomes necessary to replace the filter media in the filter cartridge, the entire cartridge is removed and thrown away and a new cartridge installed in its place.

In filter arrangements of this type, it is necessary to minimize contact between the adjacent filter bags to maintain a uniform flow of gases through the filters as well as to effectively utilize the entire area of the filter media in the filter bags. If this is not done, there can be a substantial pressure loss in the air stream as it flows through the filter cartridge with an attendant increase in the energy required to operate the system. One way of doing this has been to sew the opposing walls of each of the filter bags together so that the filter assumes the shape of a series of separate, adjacent tube-like sections upon its inflation by the gas stream during use. However, while that type of arrangement has proven to be very effective in maintaining separation between the adjacent filter bags, the filter media proximate each of the seams is unavailable for filtering and thus larger and bulkier filters have generally been required. Other arrangements have maintained separation between the adjacent filter bags by shaping them in a tapered or wedge-like configuration. This approach has also proven effective but similarly has required the use of larger filters as well as being relatively difficult to manufacture.

SUMMARY OF THE INVENTION

The present invention relates to gas separation devices and in particular to the filter bags in a pocket filter cartridge suitable for removing particulate solids from a dirty gas stream.

The filter cartridge includes a plurality of relatively flat, sheath-like filter bags suspended from a generally rectangular header assembly in side-by-side relation. Each of the filter bags is assembled from a pair of generally rectangular panels or sheets of flexible filter media sewn together on three sides to form the closed downstream end of the bag and open on the remaining side to form the mouth of the bag which is secured to the header assembly. The filter bag includes a plurality of alternating rows of filamentary stays or span stitching spaced across the width of the bag and extending generally parallel to one another along its length so that upon inflation of the bag by the dirty gas stream during use, the stays shape the bag into a plurality of adjacent tube-like sections opening into one another within the bag. It should be particularly noted that the stays in each row are of a different length than the stays in the rows adjacent to it to alternately vary the thickness of the bag at the juncture of the tube-like sections formed in the bag. This relatively compact and easily fabricated arrangement effectively maximizes the surface area of the filter media available for filtration while at the same time maintaining sufficient separation between the bags to minimize pressure losses in the gas stream flowing through the filter cartridge.

When considering the foregoing, it is to be understood that various changes can be made in the arrangement, form and construction of the apparatus disclosed herein without departing from the scope and spirit of the invention.

DESCRIPTION OF THE PREFERRED EMBODIMENT

Figure 1:
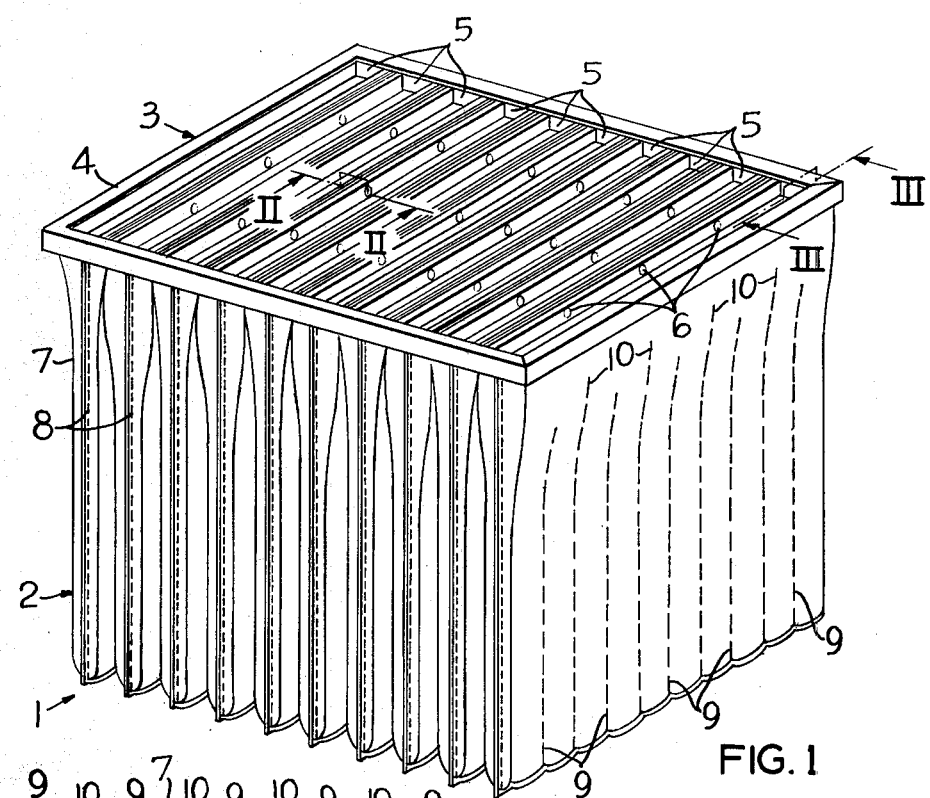
FIG. 1 is an isometric view of the filter cartridge.

As shown in FIG. 1, each of the filter cartridges 1 includes a plurality of relatively flat, sheath-like filter bags 2 secured in side-by-side relation to a generally rectangular header assembly 3 adapted to be removably secured across a dirty gas stream in a gas duct. As discussed above in regard to the prior art, this type of cartridge is to be secured across the gas duct so that particulate materials are separated from the gas stream as it flows through the filter media from the interior of each of the filter bags.

Figures 2, 3:
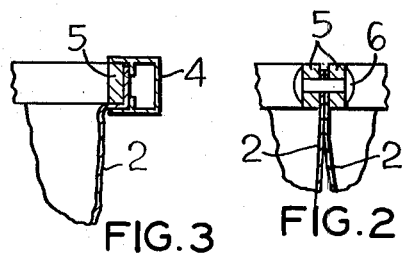
FIG. 2 is an elevational cross-sectional view taken substantially along line II—II in FIG. 1.
FIG. 3 is an elevational cross-sectional view taken substantially along line III—III in FIG. 1.

The header assembly 3 includes a generally rectangular frame 4 and a plurality of elongated rectangular collars 5, each of which is aligned in the mouth of one of the filter bags 2 and supported within the frame 4 to secure the filter bags to the header assembly. More particularly, after the collars 5 are positioned in the filter bags, they are secured together by rivets 6 so that the filter media forming the mouth of each of the filter bags is clamped between the adjacent collars 5 as shown in FIG. 2. Thereafter, the four legs of the frame 4 are secured about the outermost ends and sides of the collars 5 as indicated in FIG. 3 so that the outermost portions of the filter bags are clamped between the legs of the frame 4 and the collars 5 to complete the assembly. In this regard, it is to be understood that the invention also contemplates using various other header arrangements to secure the filter bags in the filter cartridge. For example, the snap-together sheet metal header arrangement shown in U.S. patent application Ser. No. 214,270 filed Dec. 8, 1980 would be suitable for this purpose as would be the plastic header construction shown in U.S. patent application Ser. No. 202,568 filed Oct. 31, 1980, both of which are assigned to the assignee of this application.

Figure 5:
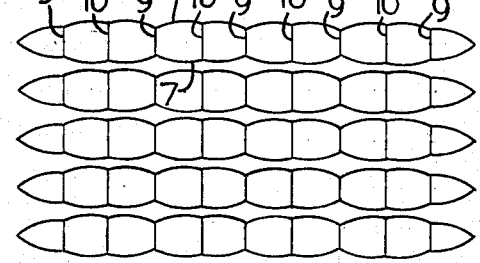
FIG. 5 is a plan cross-sectional view taken substantially along line V—V in FIG. 4.
Figure 4:
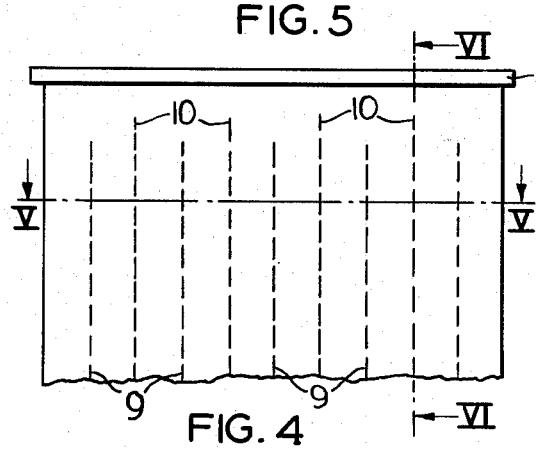
FIG. 4 is partial side elevational view of the filter cartridge shown in FIG. 1.
Figure 6:
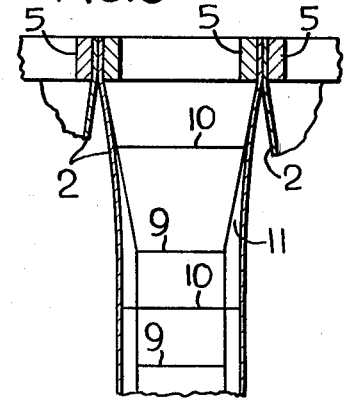
FIG. 6 is an elevational cross-sectional view taken substantially along line VI—VI in FIG. 4.

Referring to FIGS. 4-6, each of the filter bags 2 is assembled from a pair of generally rectangular filter panels or sheets 7 of a flexible filter media sewn together on three sides as indicated at 8 to form the closed downstream end of the bag and open on the remaining side to form the mouth of the bag. Each of the filter bags 2 is provided with parallel rows of filamentary stays or seams of span stitching shown schematically at 9 and 10 which are spaced across the width of the bag and interconnect its opposing filter panels 7. The first stays 9 are preferably in the range of ½ to ¾ of the length of the second stays 10 so that upon inflation of the filter bags by the dirty gas stream during use, the stays shape each of the bags into a plurality of adjacent, tube-like sections opening into one another and being divided by the stays in a manner alternately varying the thickness of each of the bags across its width. This arrangement has been found to essentially minimize the mechanical interference between the adjoining filter bags during use of the filter cartridge so as to minimize pressure losses in the gas stream resulting from the filter media in the adjoining filter bags coming into contact with one another. Additionally, the mouth of each of the filter bags is shaped to minimize turbulence in the dirty gas stream as it flows into the interior of the filter bags. This further abates the development of pressure losses in the gas stream. As shown in the drawings, the stays 9 and 10 extend along substantially the length of each of the filter bags and terminate proximate the frame 4 in a manner providing a relatively smooth transition in the filter panels 7 between the tube-like sections and the frame. This is accomplished by spacing the shorter first stays 9 a greater distance from the frame 4 than the longer second stays 10 so that upon inflation of the filter bag a relatively smooth and continuous transition 11 is maintained about the mouth of each of the filter bags as shown in FIG. 6.

Figure 8:
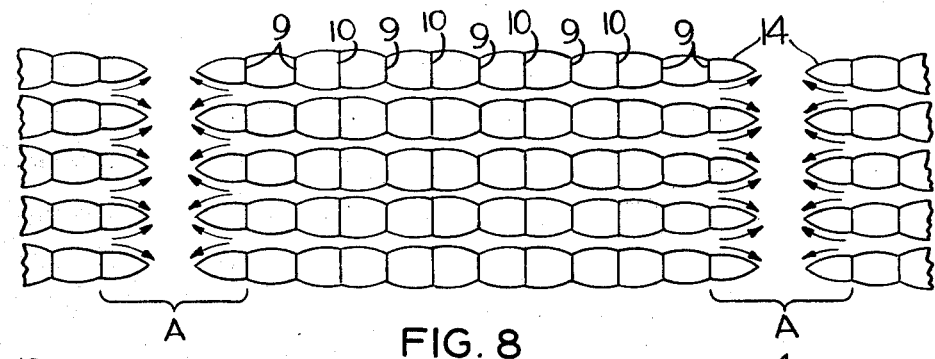
FIG. 8 is a plan cross-sectional view taken substantially along line VIII—VIII in FIG. 7.
Figure 7:
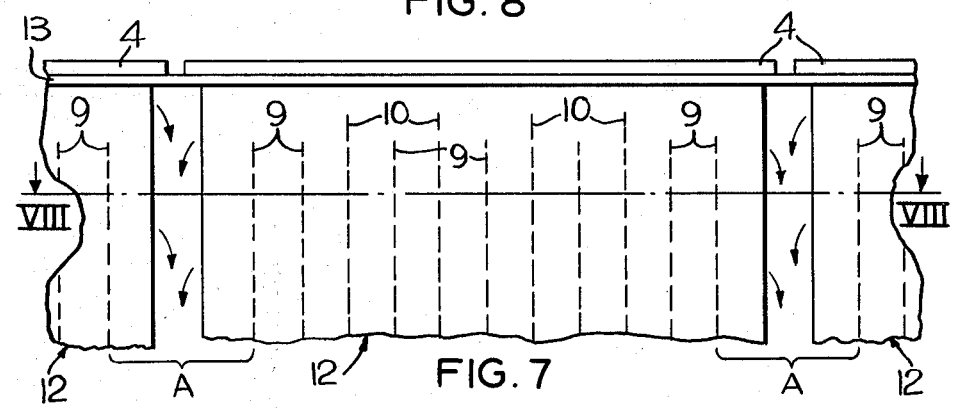
FIG. 7 is a partial side elevational view of a second embodiment of the filter cartridge.

FIGS. 7 and 8 show another embodiment of the invention wherein a plurality of filter cartridges 12 are secured to a grid or apertured plate 13 in an adjacent side-by-side fashion by any one of a variety of conventional clamps (not shown). In the embodiment shown in the drawings, wherein like numerals identify elements similar to those shown in FIGS. 1-5, a plurality of filter bags 14 are secured to the frame 4 as in the first embodiment. Each of the filter bags 14 includes spaced rows of first and second stays 9 and 10 which are alternated across the bag except at its sides where there are two rows of the first stays 9 on either side of the bag. This arrangement has proven to be particularly desirable where a plurality of the filter cartridges 12 are mounted adjacent to one another as on the grid or supporting plate 13 since it reduces resistance to lateral flow of the cleaned gases between the filter bags in the regions "A" as generally indicated by the arrows shown in FIGS. 7 and 8. This is believed to minimize pressure losses in the air stream due to mechanical interference as well as turbulence between the bags while at the same time providing a relatively compact assembly.

Figure 10:
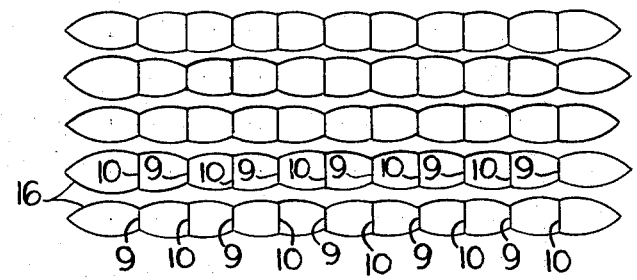
FIG. 10 is a plan cross-sectional view taken substantially along line X—X in FIG. 9.
Figure 9:
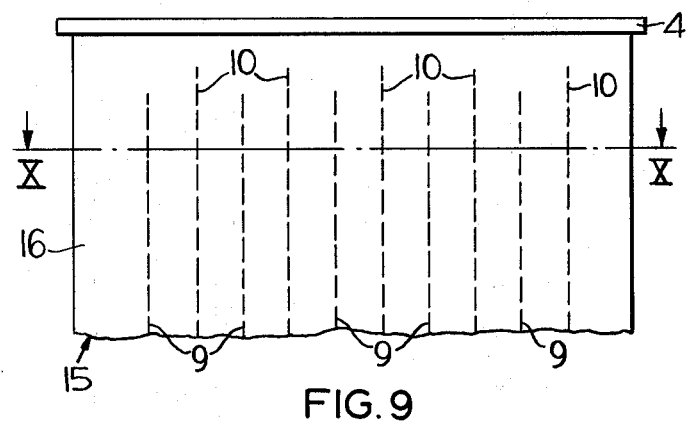
FIG. 9 is a partial side elevational view of a third embodiment of the filter cartridge.

FIGS. 9 and 10 show a filter cartridge 15 illustrating another embodiment of the invention wherein rows of the first and second stays 9 and 10 are alternately spaced across the width of each of its filter bags 16 commencing with a row of the first stays 9 on one side of the bag and ending with a row of the second stays 10 on the other side of the bag. It should be particularly noted that the filter bags 16 are secured to the frame 4 in an alternating fashion so that the first stays 9 of each of the bags are transversely aligned with the second stays 10 of the bags adjacent to it. This arrangement has been found to abate pressure losses in the gas flow due to interference between the bags even further while similarly providing a relatively compact and easily handled assembly.

The embodiments of the invention in which an exclusive property or privilege is claimed are defined as follows:

1. A gaseous fluid filter assembly for removing particulate solids from a dirty gas stream, comprising:
   a mounting frame adapted to be secured across the dirty gas stream;
   a plurality of sheath-like filter bags mounted within the frame in side-by-side relation, each of said bags including a pair of generally rectangular filter panels forming the sides of the bag and having an open upstream end and a closed downstream end;
   first and second stay means interconnecting the filter panels of each bag in spaced relation, said first and second stay means extending generally parallel to one another along the length of each bag and being alternately disposed across substantially its width to shape each bag into a plurality of adjacent tube-like sections which are each of an essentially uniform cross-section throughout the length of each bag and open into one another upon inflation of each bag by the gas stream; and
   said first stay means being of a lesser length extending between the filter panels of each bag than said second stay means, so as to alternately vary the thickness of each bag when it is inflated at the junctures of said tube-like sections to minimize interference between the adjacent filter bags while maximizing the surface area of each of the filter panels available to filter the dirty gas stream along substantially the entire length of the bags.

2. The filter assembly according to claim 1, and
   said first and second stay means being alternatively positioned across the width of each bag commencing with said first stay means; and
   said bags being oppositely positioned within the frame so that the first stay means of each bag is aligned with the second stay means of the bags adjacent to it.

3. The filter assembly according to claim 1, and
   each of said bags having a plurality of spaced side-by-side first stay means extending along the opposite sides of each bag.

4. The filter assembly according to claim 1, and
   said frame including means retaining the open end of each bag in a generally elongated rectangular configuration; and
   said first and second stay means being spaced from said frame, said first stay means being spaced a greater distance from the frame than said second stay means to form a smooth transition in the filter panels between the tube-like sections and the frame.

5. The filter assembly according to claim 1, and
   said first and second stay means being equally spaced from one another across the width of each bag.

6. The filter assembly according to claim 1, and said first and second stay means being parallel seams of span stitching extending along the length of each bag.

7. The filter assembly according to claim 6, and the length of the span stitching forming said first stay means being in the range of ½ to ¾ the length of the span stitching forming said second stay means.

8. The filter assembly according to claim 6, and the length of the span stitching being relatively uniform along each seam.

* * * * *